United States Patent Office 3,657,167
Patented Apr. 18, 1972

3,657,167
SUGAR DITHIOACETAL POLYDISULFIDES AND PROCESS OF MAKING
Robert Eugene Gramera, Dublin, Calif., assignor to CPC International Inc., Englewood Cliffs, N.J.
No Drawing. Continuation-in-part of application Ser. No. 694,119, Dec. 28, 1967. This application Dec. 10, 1969, Ser. No. 883,999
Int. Cl. C08b 25/00; C08g 1/00
U.S. Cl. 260—9                         33 Claims

ABSTRACT OF THE DISCLOSURE

A polymeric composition comprising sugar dithioacetal polydisulphides having the following structural formula:

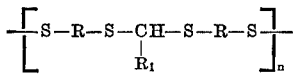

where $R_1$ is the non-aldehyde residue of a sugar, R is an inert divalent radical, generally hydrocarbon, and $n$ is an integer ranging from about 50 to about 1000. Also disclosed is a method of preparing the above composition by reaction of an aldehyde-bearing sugar and a dithiol compound in the presence of a solvent and an oxidant. Also disclosed is the polymerization of dithiol compounds by the same method and a method of preparing sugar polydithioacetals by reaction of a sugar dithioacetal with a dithiol compound in the presence of a Lewis acid catalyst wherein both transdithiolacetalation and polymerization take place.

---

This application is a continuation-in-part of copending application, Ser. No. 694,119, filed Dec. 28, 1967 now abandoned.

Due to their versatility of use, there is a continuing need for sulphur-containing polymers. Organic polysulphides are used for example as heat-resistant, high-adhesion sealing compounds for integral fuel tanks in the aircraft industry and as sealants for storage tanks. Materials of this type are further used for applications involving castings, coatings, laminates, potting, adhesives, etc. If novel sulphur polymers could be prepared, they would find ready acceptance in the above and other fields of application.

It therefore becomes an object of the invention to provide new organic polymers containing sulphur in their repeating mer units.

A more specific object of the invention is to prepare polymeric compositions comprising sugar dithioacetal polydisulphides.

A still further object of the invention is to provide a method of preparing the above polymer compositions by reaction of a sugar and a dithiol compound via a novel scheme. Such procedure is also adaptable to preparing polysulfides via polymerization of dithiol compounds.

Yet another object of the invention is to prepare sugar polydithioacetals in a still further novel procedure.

Other objects will appear hereinafter.

In accordance with the invention, novel sulphur polymers have been discovered as well as their method of preparation. Broadly speaking, these polymeric compositions comprise sugar dithioacetal polydisulfides conforming to the following structural formula:

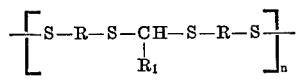

where $R_1$ is the non-aldehyde residue of a sugar, R is a divalent saturated or aromatic hydrocarbon, ether or thioether group, or a divalent saturated or aromatic hydrocarbon, ether or thioether group containing one or more pendant halo, ether, ester or nitro groups, and $n$ is an integer ranging from about 50 to about 1000. These materials are made by reaction of an aldehyde-bearing sugar and a dithiol compound in the presence of an oxidant and a solvent for said reactants.

In the reaction of the invention the above compounds are made by dissolving a sugar and an organic dithiol compound in a solvent for the reactants such as acetone, benzene, or any other liquid which acts as a mutual solvent for the sugar and dithiol reactants. An oxidant is then introduced and polymerization between the sugar and dithiol initiated. Any oxidant such as oxygen, iodine, etc. may be utilized here which induces sulphydryl oxidation whereupon S—S bonds are formed during the polymerization. The oxidant, of course, is reduced during the combination of polymerization and oxidation reactions.

The variables of the reaction including time, temperature, etc. will be largely dependent upon the type of sugar or dithiol reactants involved, oxidant uttilized, concentration of reactants, etc. In a preferred embodiment the polymerization reaction is carried out at a temperature ranging from about 85° C. to about 150° C. over a period of time ranging from about 6 to about 16 hours. The concentration of the reactants in the solvent may be widely varied, but usually ranges from about 15% to about 50% by weight based on the combined weight of reactants and solvent.

In a greatly preferred embodiment the process of the invention is carried out by utilizing a solvent which also itself acts as an oxidant. Admirably suited here are such compounds as dimethylsulfoxide and tetramethylene sulfoxide. During the reaction the dimethylsulfoxide reactant, for example, will be reduced to dimethylsulfide in oxidizing the polymer being formed to create the desired S—S bonds.

Again, depending upon the reaction conditions the number of repeating units present in the polymer can be varied. Typical polymers will contain from about 50 to about 1000 units of the type defined above, and more often will contain 100–500 units as expressed by the number $n$. In terms of their molecular weight, the polymers of the invention will usually have a molecular weight in excess of 15,000 and more often will have a molecular weight in excess of 25,000. The molecular weight of these polymers may range as high as 200,000, but usually will not be in excess of 100,000.

The sugar reactant may be any aldehyde-bearing sugar including all isomers of hexose, pentose, triose, etc. classes. Typical sugars of this type which may be specified include glucose, mannose, galactose, lactose, fructose, glyceraldehyde, threose, arabinose, etc. Preferred are D-glucose, D-xylose, D-galactose, and D-mannose with D-glucose being most preferred due to ready availability, low cost, and excellent reactivity in the reaction specified herein.

The dithiol compound may be selected from a wide range of organic dithiol compounds, the only limitation being that the portion of the molecule separating the thiol groups be relatively inert, i.e., unreactive with the sugar aldehyde group under the reaction conditions of the process of this invention. This unreactive portion of the dithiol molecule may be a saturated or aromatic hydrocarbon, ether or thioether group, which may contain one or more pendant halo, ether, ester or nitro groups. Thus, it may be an alkylene group such as ethylene, propylene, hexamethylene or xylylene. It may be an arylene group such as phenylene, biphenylene (xenylene) or naphthylene. It may be a cycloaliphatic group such as 1,4-cyclohexylene. Similarly, it may be a hydrocarbon ether or thioether group such as would be derived from bis(2-mercaptoethyl) sulfide, 4,4'-bis(mercaptomethyl) diphenyl ether and bis(4-mercaptobutyl) ether. In each case, the above illustrative dithiol compound may contain pendant halo, ether, ester or nitro groups. Thus, suitable dithiol compounds include propylene dimercaptan (which contains a pendant methyl group), 4,4'-bis(mercaptoethyl)-2,2'-diethyl biphenyl and 1,4'-bis(mercapto)-3-chloro cyclohexane.

Thus, in the above reaction itself the dithiol compound will react with the aldehyde portion of the sugar to initially give a dithioacetal or dimercaptal. This will be in turn followed by the polymerization portion of the reaction which is also catalyzed by the oxidant whereby S—S linkages in the repeating units of the polymer are formed. Thus, $R_1$ in the above general formula defining the polymers here will then represent the non-aldehyde residue of the sugar. R is that portion of the polymer derived from the organic dithiol compound and depending upon the type of dithiol reactant will be widely varied as to its chemical structure. As an example, R will include such diverse groups as

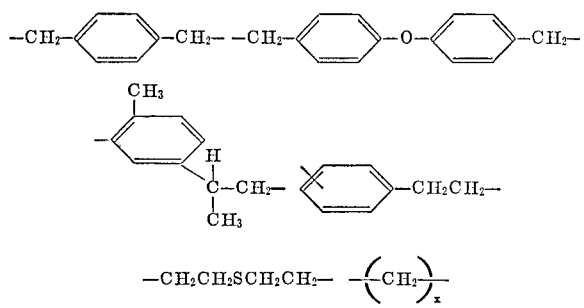

where $x$ is a number ranging from 5 to 10 and is preferably an even number.

In another variation of the above process a dithiol compound is first reacted with the aldehyde-bearing sugar under a relatively low temperature whereby a sugar acetal is first formed. The sugar acetal or dimercaptal is then polymerized by resort to the solvent-oxidant system described above.

In a further embodiment of the invention polysulfides may be prepared via the same procedure as outlined above, that is by resort to use of a solvent and an oxidant, and preferably by employment of a solvent which also acts as an oxidant. Here, only a dithiol compound is polymerized to form polysulfides. The reaction conditions previously set forth are also applicable here. In yet another variation two or more different dithiol compounds may be dissolved in a solvent containing an oxidant and interpolymerized.

In a still further embodiment of the invention, an aldehyde-bearing sugar of the type described above is first reacted with a monomercaptan compound to produce a sugar dithioacetal derivative. These materials may be represented by the following structural formula:

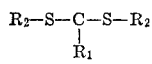

where $R_2$ is the residue derived from the monomercaptan employed and $R_1$ is as above defined. $R_2$ will vary widely, of course, depending upon the monomercaptan used to make the sugar acetal. Thus, such monothiol compounds as methylmercaptan, ethylmercaptan, etc. may be used whereupon $R_2$ may be alkyl, aryl, alkaryl, cycloaliphatic, heteryl, etc.

After forming such dithioacetal derivative a dithiol compound of the type already described may then be further reacted with the above sugar acetal in presence of a Lewis acid whereupon a sugar polydithioacetal polymer is formed having the following general formulaz

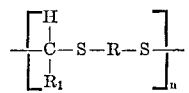

where $R_1$ is the non-aldehyde residue of a sugar and R represents a moiety as already defined here. Again, $n$ represents the number of repeating units in the polymer and may range from about 50 to about 1000, and more often falls within 100 and 500.

The Lewis acid catalyst used here may include such compounds as mineral acids including sulphuric, phosphoric, and hydrochloric acids. Preferred Lewis acid catalysts include titanium halide such as titanium tetrachloride or boron trifluoride. Titanium tetrachloride is particularly preferred.

While polymers of this type have already been made by reaction of sugar and dithiol compounds it has been discovered here that the reaction proceeds at a higher rate and in better yields if the sugar thioacetal is first formed which then undergoes transdithiolacetalation and polymerization by further reaction with an organic dithiol compound in presence of a Lewis acid. The sugar dithioacetal is merely dissolved in the dithiol reactant and then polymerized whereby the dithiol residue becomes part of the sugar polymer through transdithiolacetalation and the former portion of the acetal part of the sugar is replaced.

The following examples illustrate typical polymers of the invention and their mode of preparation. It is understood, of course, that these examples are meant to illustrate the invention, and that the invention is not to be limited thereto.

SUGAR DITHIOACETAL POLYDISULPHIDES

Example I

D-glucose (1 mole) was first dissolved in cold concentrated hydrochloric acid (8 moles). The solution was maintained at 5° C. whereupon 4,4'-bis(mercaptomethyl) diphenyl ether (2.3 moles) was added. The heterogeneous reaction mixture was stirred 14 hours at 15° C. and then poured into ice water which was neutralized with solid sodium bicarbonate. The neutralized solution was then extracted with three portions of chloroform. The combined chloroform extracts were washed several times with water and dried over anhydrous sodium sulfate. After the chloroform was filtered and vacuum stripped, the product, D-glucose-di(4-thiomethyl - 1 - phenoxy-phenyl-4'-methylthio) acetal was dissolved in dimethyl sulfoxide and polymerized.

The polymerization was carried out by heating the homogeneous reaction mixture to 85–90° C. Within 2 hours an increase in solution viscosity was apparent, indicating polymerization was taking place. The reaction mass was then heated for an additional six hours and then cooled to 50° C. The polymer was isolated by pouring the reaction mixture into a stirred solution of chilled ethyl alcohol. A white taffy-like polymeric substance was then obtained which was further washed with fresh ethanol and then dissolved in chloroform. The chloroform phase was washed with a dilute sodium bicarbonate solution followed by washing with water. The chloroform containing the polymer was then dried over anhydrous sodium sulfate. The chloroform was then filtered and vacuum stripped leaving the polymer behind. The polymer was thermoplastic and exhibited a transparent glassy character. The sugar polysulfide exhibited a melting point of 86° C. and had an inherent viscosity of 0.47.

Example II

This example was run according to the directions of Example I with the exception that D-xylose was used instead of D-glucose.

Example III

This example was run according to the directions of Example I with the exception that D-galactose was used instead of D-glucose.

Example IV

This example was run according to the directions of Example I with the exception that D-mannose was used instead of D-glucose.

Example V

This example was run according to the procedure outlined in Example I with the exception that 4,4'-bis(mercaptomethyl) benzene was the dithiol reactant involved.

Example VI

This example was run according to the procedure outlined in Example I with the exception that 1,10-decanedithiol was utilized as a dithiol source.

PREPARATION OF POLYSULFIDES

Example VII

To 6 moles of dimethyl sulfoxide was added 1 mole of liquid 4,4'-bis(mercaptomethyl) diphenyl ether. The homogeneous reaction mixture was heated to 85–90° C. for about 8 hours, then cooled and poured into chilled ethyl alcohol whereupon a white taffy-like substance precipitated. After washing with ethanol the polymer was further purified by dissolving it in chloroform and then removing the chloroform, leaving behind the thermoplastic polydisulfide polymer. The polymer exhibited a flow point at 95° C. and had an inherent viscosity of 0.57.

Example VIII

The procedure of Example VII was followed with the exception that the 4,4'-bis(mercaptomethyl) diphenyl ether in this run was copolymerized with dithiolterephthalic acid. The reaction temperature here was 125° C., the reaction time was a total of 4 hours, and tetramethylene sulfoxide was utilized as the oxidant. The flow point of the polymer was 65° C. and the polymer exhibited an inherent viscosity of 0.37.

Example IX

The procedure of Example VII was followed with the exception that p-xylylene dimercaptan was polymerized here. The flow point of the polymer was 75° C. The polymer exhibited an inherent viscosity of 0.46.

Example X

Here, 1,10-decanedithiol was polymerized according to the procedure of Example VII. A wax-like substance precipitated from the reaction mixture and after a period of time was transformed into a white powdered solid. This product was filtered and then washed with ethanol. The flow point of the polymer was 54° C. and the polymer had an inherent viscosity of 0.41.

Example XI

The procedure of Example X was followed with the exception that 1,8-octanedithiol was polymerized. The polymer had a flow point of 61° C. and an inherent viscosity of 0.47.

Example XII

Here, 1,6-hexanedithiol was polymerized according to the procedure of Example X. The polymer had a flow point of 57° C. and an inherent viscosity of 0.30.

Example XIII

In this series of runs three additional dithiols were polymerized according to the procedure outlined in Example VII. Specifically, dipentene dimercaptan, ethyl cyclohexyl dimercaptan and bis(2-mercaptoethyl) sulphide were separately polymerized.

PREPARATION OF SUGAR POLYDITHIOACETAL POLYMERS BY COMBINED TRANSDITHIOL-ACETALATION AND POLYMERIZATION PROCESS

Example XIV

D-glucose diethyl dithioacetal was first formed by reaction of D-glucose with ethyl mercaptan. One mole of the dithioacetal product was then dissolved in 6 moles of bis(2-mercaptoethyl) sulphide. The mixture was gently warmed to 40° C., placed under vacuum and a small catalytic amount of titanium tetrachloride added thereto. Within a few minutes the viscosity of the material had measurably increased and finally gelation occurred. During the transdithiolacetalation reaction ethyl mercaptan was driven off as a by-product and a polymer formed which contained the residue from the bis(2-mercaptoethyl) sulphide. The inherent viscosity of the polymeric product was 0.51.

Example XV

In this run the procedure of Example XIV was followed with the exception that 1,10-decanedithiol was the reactant dithiol compound. The resultant polymer had an inherent viscosity of 0.36.

The above described polymers may be used for a wide variety of applications, particularly those wherein organic polysulphides are conventionally employed. Thus, they may be used as electrical insulating compounds, in potting, in coating wires, as adhesives such as wood adhesives, as fuel tank liners, as underground cement tank liners, as permanent sizing agents for textiles, as latex paint additives, as sealers, as fungicides, as epoxy polymer extenders to impart flexibility thereto, as metal-to-metal adhesives, as metal-to-glass adhesives, as waterproofing agents, as accelerators for vulcanization, as anti-oxidants or stabilizers for synthetic rubber latexes and coagulated polymers, as softening agents for reclaimed vulcanizates, as reclaiming agents for natural rubber, neoprene, and various diene elastomers, as short-stoppers in emulsion polymerization, as flexible resilient paint coatings, as leather impregnants, in the formation of flexible molding patterns and electric cable insulators, as rubber- metal bonding adhesives, to improve properties of fuel and lubricating oils, as pour-point depressants, as lubricating oil additives, as fungistatics, as anti-bacterial agents, as insecticides, etc.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The invention is hereby claimed as follows:

1. A polymeric composition consisting essentially of a sugar dithioacetal polydisulphide having the following repeating mer unit:

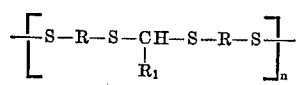

where $R_1$ is the non-aldehyde residue of a sugar, R is an inert organic divalent radical, and $n$ is an integer ranging from about 50 to about 1000.

2. The polymeric composition of claim 1 wherein R is alkylene, arylene, cycloaliphatic, hydrocarbon ether or hydrocarbon thioether.

3. The composition of claim 1 wherein $R_1$ is the non-aldehyde residue of D-glucose.

4. The composition of claim 1 wherein $R_1$ is the non-aldehyde residue of D-xylose.

5. The composition of claim 1 wherein $R_1$ is the non-aldehyde residue of D-galactose.

6. The composition of claim 1 wherein $R_1$ is the non-aldehyde residue of D-mannose.

7. The composition of claim 1 wherein R is an alkylene group having 5 to 10 carbon atoms.

8. The composition of claim 1 where R is xylylene.

9. The composition of claim 1 where R is

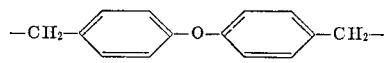

10. The composition of claim 1 where R is

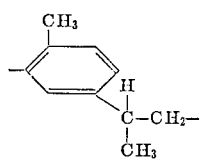

11. The composition of claim 1 where R is

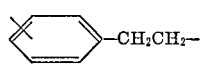

12. The composition of claim 1 where R is

—CH$_2$CH$_2$SCH$_2$CH$_2$—

13. The composition of claim 3 where R is an alkylene group having 5 to 10 carbon atoms.

14. The composition of claim 3 where R is

15. The composition of claim 3 where R is

16. The composition of claim 3 where R is

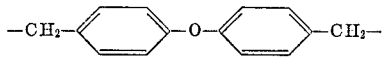

17. The composition of claim 3 where R is

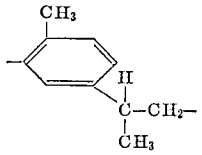

18. The composition of claim 3 where R is

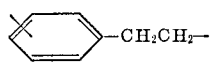

19. The composition of claim 1 where $n$ ranges from about 100 to about 500.

20. The composition of claim 3 where $n$ ranges from about 100 to about 500.

21. The composition of claim 7 where $x$ is an even number.

22. A method of making the composition of claim 1 which comprises reacting an aldehyde-bearing sugar and an organic dithiol at a temperature of from about 85° C. to about 150° C. in the presence of a liquid which is a mutual solvent for the sugar and dithiol reactants, and an oxidant which induces sulfhydryl oxidation whereupon S—S bonds are formed.

23. The method of claim 22 wherein said solvent also acts as an oxidant whereupon said solvent is reduced during said reaction.

24. The method of claim 22 wherein said solvent is dimethyl sulfoxide which is reduced in said reaction to dimethyl sulphide.

25. The method of claim 22 wherein said reaction is carried out at a temperature ranging from about 85 to about 150° C. for a period of time ranging from about 6 to about 16 hours.

26. The method of claim 22 wherein said sugar reactant is D-glucose.

27. The method of claim 26 wherein said solvent also acts as an oxidant wherein said solvent is reduced during said reaction.

28. The method of claim 27 wherein said solvent is dimethyl sulfoxide which is reduced during said reaction to dimethyl sulphide.

29. A method of preparing sugar polythioacetals which have repeating units consisting essentially of the following general formula:

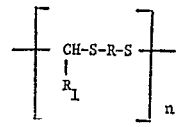

where $R_1$ is the non-aldehyde residue of a sugar, R is alkylene, arylene, cycloaliphatic, hydrocarbon ether or hydrocarbon thioether, and $n$ is an integer ranging from about 50 to about 1,000 which comprises reacting a sugar thioacetal and an organic dithiol compound in the presence of a Lewis acid catalyst wherein both transdithioacetalation and polymerization take place.

30. The method of claim 29 where D-glucose diethyl dithioacetal is reacted with bis(2-mercaptoethyl) sulphide to produce a polymeric compound wherein $R_1$ is the non-aldehyde residue of D-glucose and R is

—CH$_2$CH$_2$SCH$_2$—

31. The method of claim 29 wherein said Lewis acid catalyst is titanium tetrachloride.

32. The method of claim 29 wherein D-glucose diethyl dithioacetal is reacted with 1,10-decanedithiol wherein a polymeric compound is produced where $R_1$ is the non-aldehyde residue of D-glucose and R is $(CH_2)_{10}$.

33. The method of claim 32 wherein said Lewis acid catalyst is titanium tetrachloride.

References Cited

UNITED STATES PATENTS 3,314,913    4/1967    Deutschman et al.    260—79
3,350,367    10/1967    Wakasa et al.    260—79

OTHER REFERENCES

Jour. Polymer Science: Part A, vol. 3, pp. 1985–1992 (1965), Horvath et al.

WILLIAM H. SHORT, Primary Examiner

E. WOODBERRY, Assistant Examiner

U.S. Cl. X.R.

260—79